Nov. 7, 1961     M. B. ADKINS     3,008,114
CABLE CLIP FOR POSITIVE AND NEGATIVE BATTERY TERMINALS
Filed Aug. 24, 1959
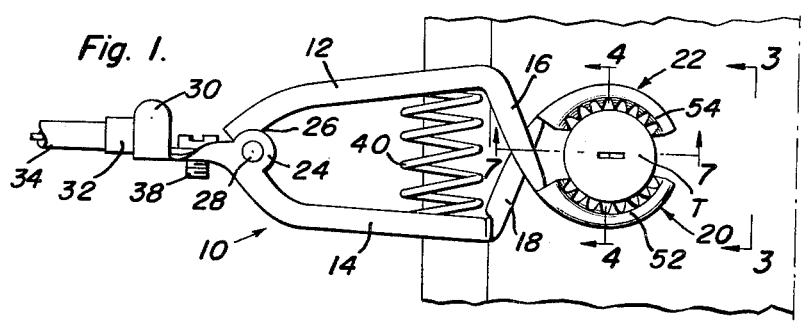
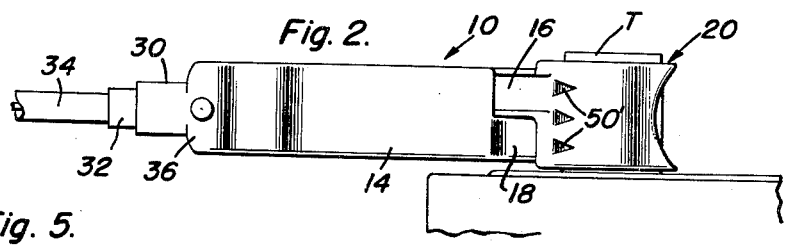
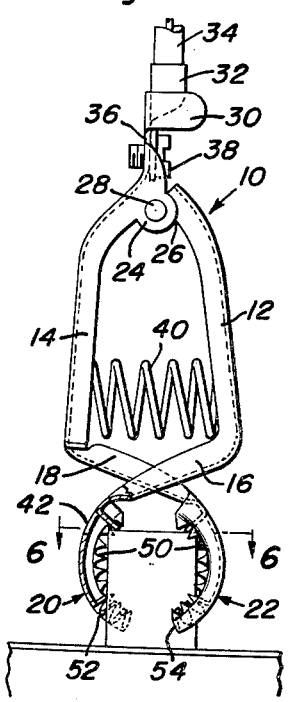
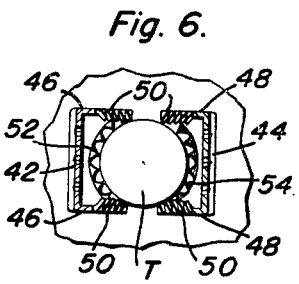
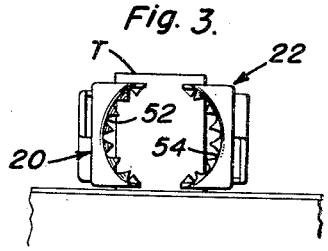
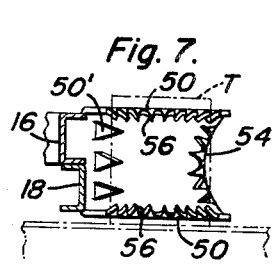
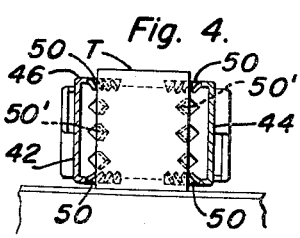
Mason B. Adkins
INVENTOR.
BY *Clarence A. O'Brien*
and *Harvey B. Jackson*
Attorneys

United States Patent Office 3,008,114
Patented Nov. 7, 1961

3,008,114
CABLE CLIP FOR POSITIVE AND NEGATIVE BATTERY TERMINALS
Mason B. Adkins, Miami, Fla.
(3781 NW. 59th Ave., Miami Springs, Fla.)
Filed Aug. 24, 1959, Ser. No. 839,042
5 Claims. (Cl. 339—32)

This invention relates to new and useful improvements in clips and the primary object of the present invention is to provide a quick acting clamp that may be quickly and readily applied to or removed from a positive or negative battery terminal in a convenient manner even though the terminal may be corroded.

Another very important object of the present invention is to provide a cable clamp for battery terminals including a pair of spring pressed jaw members that are so constructed as to permit the clamp to be applied to a terminal from one side thereof or over the top of the terminal.

A further object of the present invention is to provide a cable clip composed of two gripping jaws having teeth thereon that will effectively grip the surface of a battery terminal at its base as well as its tip.

Another object of the present invention is to provide a battery clip composed of two jaws having four sets of coacting gripping jaws for simultaneously biting into a terminal and which clip is applied to or removed from a battery terminal in five seconds.

Other objects and advantages reside in the details of construction and operation as more fully hereinafter described and claimed, reference being had to the accompanying drawings forming part hereof, wherein like numerals refer to like parts throughout, and in which:

FIGURE 1 is a top plan view of the clip attached to a battery terminal;

FIGURE 2 is a side view of FIGURE 1;

FIGURE 3 is an end view taken on the plane of section line 3—3 of FIGURE 1;

FIGURE 4 is a vertical sectional view taken substantially on the plane of section line 4—4 of FIGURE 1;

FIGURE 5 is an elevational view of the clip applied downwardly over a battery terminal;

FIGURE 6 is a horizontal sectional view taken substantially on the plane of section line 6—6 of FIGURE 5; and FIGURE 7 is a sectional view taken substantially on the plane of section line 7—7 of FIGURE 1.

Referring now to the drawings in detail, wherein, for the purpose of illustration, there is disclosed a preferred embodiment of the present invention, the numeral 10 represents a cable clip of sensitized metal composed of a pair of channel-shaped levers 12 and 14 having laterally projecting criss-crossed end portions 16 and 18 that terminate in jaws or jaw members 20 and 22. The end portion 18 of the lever 14 is offset relative to the lever 14 and the end portion 16 so that the jaw 20 will register with the jaw 22.

A pair of ears 24 is provided on the flanges of the lever 14 remote from the jaw 22 and the ears 24 receive therebetween another pair of ears 26 on the flanges of the lever 12 remote from the jaw 20. The ears 24 and 26 are secured together by one or two pivots 28.

The lever 14 is provided with a bendable sleeve or socket portion 30 adjacent the ears 24 that receives and embraces the eye end 32 of a cable 34. The sleeve 30 is joined with the lever 14 by an apertured plate 36 that receives a fastener 38. The fastener 38 extends through the eye end 32 and is threaded in the plate 36 to detachably secure the clip to the cable.

The jaws 20 and 22 are substantially channel-shaped in cross-section and they are similar in size. A coil spring 40 is biased between the levers 12 and 14 and is positioned between the flanges of each lever to yieldingly urge the levers 12 and 14 apart and the jaws 20 and 22 toward each other.

The jaws 20 and 22 are longitudinally curved or bowed and therefore include concavo-convexed plates 42 and 44 having spaced parallel flanges 46 and 48. Each of the flanges 46, 48 is provided with a toothed concaved edge 50 that will embrace and whose teeth 56 will grip a battery terminal T when the clip 10 is disposed perpendicular to the terminal T. Certain of the teeth on edges 50 will also bite into the terminal T when the clip is applied vertically on the terminal.

The outer ends of the plates 42 and 44 are provided with toothed concaved edges 52 and 54 that extend between the side flanges of the members 20 and 22 to surround and grip the terminal T when the clip is applied vertically over the terminal and to also grip the terminal T when the clip is applied perpendicular to the terminal.

Additional sets of gripping teeth 50 are struck from the rear ends of plates 42 and 44 and all of these teeth will bite into the terminal when the clip is positioned as shown in FIGURES 1–4 and 7.

The device thus described is quite durable due to the teeth construction and the dual flanged jaw members. The spring 40 may be readily replaced when its resilient characteristic is reduced and the sensitivity of the metal forming the clip will increase the conductivity thereof and permit the conduction of current therethrough even though the spring may lose some of its effective resiliency.

The teeth 56 are so arranged that they will coact with the teeth 50' and the teeth on edges 52, 54 when the clip is applied to the terminal as shown in FIGURES 1–4, inclusive, and 7, and the teeth 56 also coact with the teeth on edges 52, 54 when the clip is applied to the terminal, as shown in FIGURES 5 and 6, to steady the clip on the terminal and cause the clip to positively grip and bite the terminal. It is thus observed that four sets of teeth coact to positively grip the terminal whether the clip is applied vertically or horizontally to the terminal, although the best gripping result is obtained when the clip is applied horizontally or at right angles to the terminal.

What is claimed as new is as follows:

1. For use on a conventional-type truncated conical storage battery post, a readily applicable and removable cable clip which may be applied to the post to assume a horizontal position at right angles to the axis of the post and, alternatively, may be applied to assume a position in general axial alignment with the axis of said post comprising a pair of pivotally connected levers having crossed end portions, gripping jaws on the crossed end portions, spring means urging the jaws towards each other, each jaw embodying a longitudinally bowed plate channel-shaped in cross-section and embodying a web portion and longitudinal spaced parallel flanges, the flanges of the respective jaws being directed inwardly and having inward arcuately curved edges provided with a multiplicity of teeth which are adapted to embrace and grip diametrically opposite sides of the battery post when the clip is in the aforementioned horizontal position, said plates having free outer ends provided with flanges directed toward each other and disposed at right angles to the first-named flanges and said second-named flanges having arcuate edges conformable when in use to half-portions of the post embraced thereby and said flanges having teeth adapted to conformingly embrace said post when the clip is in a position in axial alignment with the post, and additional series of gripping teeth struck inwardly from the webs inwardly of the second-named flanges and adapted to engage the upper truncated end of said post.

2. The structure defined in claim 1 and wherein the teeth on the edges of the first-named flanges are directed toward each other in a manner to assume positions at oblique angles to the surfaces of the post gripped thereby.

3. The structure defined in claim 1 and wherein each jaw is thus provided with four distinguishable groups of teeth, the teeth on the respective longitudinal flanges on each jaw being toed in toward the open center portion of the channel and being thus directed toward each other.

4. The structure defined in claim 1 and wherein each jaw is thus provided with four distinguishable groups of teeth, the teeth on said longitudinal flanges on each jaw being toed in toward each other, the teeth on the arcuate edges of the second-named flanges being oblique angled and the teeth on one flange converging toward the companion teeth on the complemental flange.

5. The structure defined in claim 1 and wherein each jaw is thus provided with four distinguishable groups of teeth, the teeth on said longitudinal flanges on each jaw being toed in toward the inwardly facing portion of the channel and being thus directed toward each other, the teeth on the arcuate edges of the second-named flanges being oblique angled and the teeth on one flange converging toward the companion teeth on the complemental flange, the second-named flanges being at the outer free end portions of the jaws adjacent corresponding outer ends of the first-named flanges, and the teeth which are struck from said webs being situated in a group at the innermost end portions of said longitudinal flanges.

References Cited in the file of this patent

UNITED STATES PATENTS

| | | |
|---|---|---|
| 1,492,657 | Walker | May 6, 1924 |
| 1,698,379 | Taylor | Jan. 8, 1924 |
| 2,549,589 | Flynn | Apr. 17, 1951 |

FOREIGN PATENTS

| | | |
|---|---|---|
| 876,225 | France | July 27, 1942 |